US012762976B2

(12) United States Patent
Osajima

(10) Patent No.: US 12,762,976 B2
(45) Date of Patent: Oct. 13, 2026

(54) INFORMATION PROCESSING SYSTEM, INFORMATION PROCESSING APPARATUS, AND NON-TRANSITORY COMPUTER READABLE MEDIUM

(71) Applicant: FUJIFILM Business Innovation Corp., Tokyo (JP)

(72) Inventor: Kentaro Osajima, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/177,802

(22) Filed: Mar. 3, 2023

(65) Prior Publication Data

US 2024/0062683 A1 Feb. 22, 2024

(30) Foreign Application Priority Data

Aug. 17, 2022 (JP) ................................ 2022-129895

(51) Int. Cl.
*G06F 21/00* (2013.01)
*G09C 5/00* (2006.01)
*H04N 1/44* (2006.01)

(52) U.S. Cl.
CPC ............... *G09C 5/00* (2013.01); *H04N 1/448* (2013.01)

(58) Field of Classification Search
None
See application file for complete search history.

(56) References Cited

U.S. PATENT DOCUMENTS 7,904,724 B2 * 3/2011 Kato .................. H04N 1/00204 380/243
8,014,039 B2 * 9/2011 Nohtomi .............. H04N 1/2175 709/201
2010/0031014 A1 * 2/2010 Senda ................ H04N 1/32144 713/150
2017/0048404 A1 * 2/2017 Miura ................... G06F 3/1292
2017/0337652 A1 * 11/2017 Sarin .................... H04N 1/4493
2018/0027031 A1 * 1/2018 Kodaira ................. H04N 7/152 715/753
2020/0302076 A1 9/2020 Numata
2022/0050919 A1 * 2/2022 Childress ............ G06F 21/6245

FOREIGN PATENT DOCUMENTS

JP 2001-325249 A 11/2001
JP 2007-288330 A 11/2007
JP 2007-328196 A 12/2007
JP 2017-037451 A 2/2017
JP 2020-154778 A 9/2020

OTHER PUBLICATIONS

Apr. 21, 2026 Office Action issued in Japanese Patent Application No. 2022-129895.

* cited by examiner

*Primary Examiner* — Maung T Lwin
(74) *Attorney, Agent, or Firm* — Oliff PLC

(57) ABSTRACT

An information processing system includes one or more processors configured to: manage a target element and a concealment condition, the target element serving as a concealment target and being included in an input document element of an input document, the concealment condition including at least a condition regarding an output place for outputting an output document in which concealment of the target element is performed; and on a basis of the concealment condition, perform concealment control to perform the concealment of the target element and perform output control to output the output document.

11 Claims, 13 Drawing Sheets

| ID | INSTALLATION PLACE TYPE | CONCEALMENT LEVEL |
|---|---|---|
| 123001 | LIBRARY | HIGH |
| 123002 | PRIVATE OFFICE | LOW |
| 123003 | SHARED OFFICE | HIGH |
| 123004 | USER'S HOME | LOW |
| 123005 | PRIVATE OFFICE | LOW |
| 123006 | CONVENIENCE STORE | LOW |
| 123007 | LIBRARY | HIGH |
| 123008 | SHARED OFFICE | HIGH |

⋮

| TARGET ELEMENT | REPLACEMENT ELEMENT |
|---|---|
| TTT | XXX |
| SSS | YYY |
| CCC | ZZZ |
| Appp | ABCD |
|  |  |

FIG. 11

| INSTALLATION PLACE TYPE | CONCEALMENT LEVEL |
| --- | --- |
| SHARED OFFICE | HIGH |
| LIBRARY | HIGH |
| CONVENIENCE STORE | LOW |
| USER'S HOME | LOW |
| PRIVATE OFFICE | LOW |

•
•
•

FIG. 12

| ID | INSTALLATION PLACE TYPE | CONCEALMENT LEVEL |
| --- | --- | --- |
| 123001 | LIBRARY | HIGH |
| 123002 | PRIVATE OFFICE | LOW |
| 123003 | SHARED OFFICE | HIGH |
| 123004 | USER'S HOME | LOW |
| 123005 | PRIVATE OFFICE | LOW |
| 123006 | CONVENIENCE STORE | LOW |
| 123007 | LIBRARY | HIGH |
| 123008 | SHARED OFFICE | HIGH |

⋮

INFORMATION PROCESSING SYSTEM, INFORMATION PROCESSING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2022-129895 filed Aug. 17, 2022.

BACKGROUND

(i) Technical Field

The present disclosure relates to an information processing system, an information processing apparatus, and a non-transitory computer readable medium.

(ii) Related Art

The following technology is known in which: from a viewpoint of information security, whether to allow an element of elements of an input document to be output is determined for each element; if the element is determined as not allowed to be output, the element is replaced with a cipher or the like in an output document; and then the output document is output (for example, Japanese Unexamined Patent Application Publication No. 2001-325249).

SUMMARY

With the technology as described above, elements after the replacement have a uniform external appearance, and thus convenience intended by a user who uses the output document is not provided on occasions.

Aspects of non-limiting embodiments of the present disclosure relate to providing convenience intended by a user when a process for replacing part of elements in the input document is executed to reduce information leakage risk, as compared with the replacement process is executed uniformly.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system including one or more processors configured to: manage a target element and a concealment condition, the target element serving as a concealment target and being included in an input document element of an input document, the concealment condition including at least a condition regarding an output place for outputting an output document in which concealment of the target element is performed; and on a basis of the concealment condition, perform concealment control to perform the concealment of the target element and perform output control to output the output document.

BRIEF DESCRIPTION OF THE DRAWINGS

An exemplary embodiment of the present disclosure will be described in detail based on the following figures, wherein:

FIG. 11 is a table illustrating a specific example of concealment conditions stored in the database;

FIG. 12 is a table illustrating a specific example of image forming apparatus information stored in the database;

DETAILED DESCRIPTION

Hereinafter, an exemplary embodiment of the present disclosure will be described in details with reference to the attached drawings.

Configuration of Information Processing System

Figure 1:
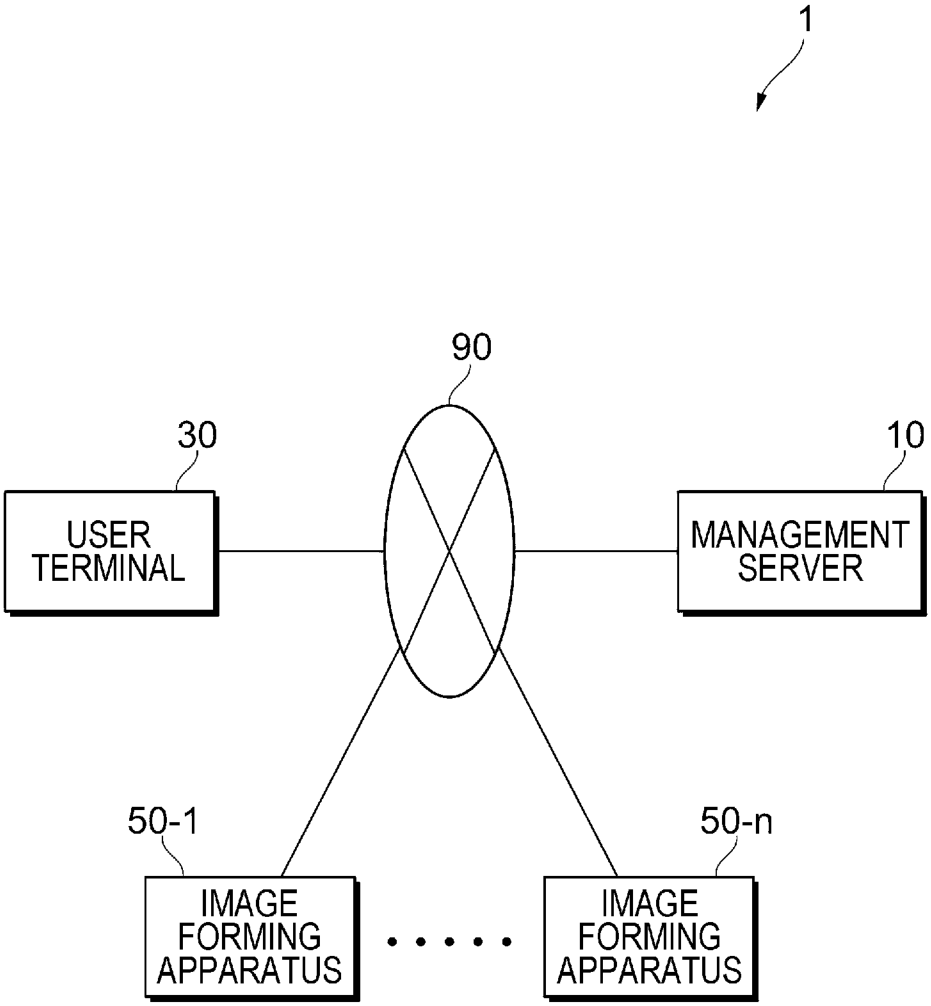
FIG. 1 is a view illustrating an example of the overall configuration of an information processing system to which this exemplary embodiment is applied.

FIG. 1 is a view illustrating an example of the overall configuration of an information processing system 1 to which this exemplary embodiment is applied.

The information processing system 1 includes a management server 10, a user terminal 30, and image forming apparatuses 50-1 to 50-*n* (n is an integer of 2 or larger) that are connected, with a network 90 interposed therebetween. The network 90 is, for example, a local area network (LAN) or the Internet. If the image forming apparatuses 50-1 to 50-*n* are not required to be explained individually, they are collectively referred to as image forming apparatuses 50.

The management server 10 is an information processing apparatus serving as a server that performs overall management of the information processing system 1. The management server 10 manages, of the elements included in the document that has been input (hereinafter, also referred to as an input document), for example, an element serving as a concealment target (hereinafter, also referred to as a target element) and a condition for concealing a target element (hereinafter, also referred to as a concealment condition). The term "element" denotes a character string or an image included in a document and includes, for example, a word, a syllable, a figure, a captured image, and a ruled line.

The management server 10 also performs control to conceal a target element on the basis of the concealment condition and then to output an output document. The concealment condition includes at least a condition regarding an output place where the output document is output. The term "concealment" denotes replacing an element with another element (hereinafter, also referred to as a replacement element) having a different external appearance and thereby preventing an outsider who sees the replacement element after the replacement from knowing the meaning or the content of the target element before the replacement. Details of processing by the management server 10 will be described later.

The user terminal 30 is an information processing apparatus operated by a user, such as a smartphone, a personal computer, or a tablet terminal. The user terminal 30 acquires, for example, information transmitted from the management server 10 and displays the information. The user terminal 30 also transmits, to the management server 10, information input through input operation by the user. Details of processing by the user terminal 30 will be described later.

Each image forming apparatus 50 is an information processing apparatus that forms an image on the recording medium on the basis of data regarding the image of the input document. The image forming apparatus 50 is also an image output device that outputs the recording medium having the image formed thereon. Examples of the image forming apparatus 50 include a multi-function printer and a printer, the multi-function printer using what is called an electrophotographic system that forms a toner image on the printing surface of a sheet, the printer using what is called an inkjet system that discharges ink onto the printing surface of the sheet. The image forming apparatus 50 acquires and displays, for example, the information transmitted from the management server 10. The image forming apparatus 50 also transmits, to the management server 10, the information input through input operation by the user.

The configuration of the information processing system 1 described above is an example. It suffices that the information processing system 1 has a function of implementing the processing described above as a whole. Accordingly, to implement the function described above, the apparatuses in the information processing system 1 may each take in charge of part or entirety of the function or may work in cooperation with each other. In other words, part or entirety of the function of the management server 10 may be applied to the function of the user terminal 30 and/or the image forming apparatus 50. Part or entirety of the function of the user terminal 30 may also be applied to the function of the management server 10 and/or the image forming apparatus 50. Part or entirety of the function of the image forming apparatus 50 may also be applied to the function of the management server 10 and/or the user terminal 30. Further, part or entirety of the function of each of the management server 10, the user terminal 30, and the image forming apparatus 50 included in the information processing system 1 may be transferred to a different server or the like (not illustrated). This promotes the processing by the information processing system 1 as a whole and enables the processing to be mutually complemented.

Hardware Configuration of User Terminal

Figure 2:
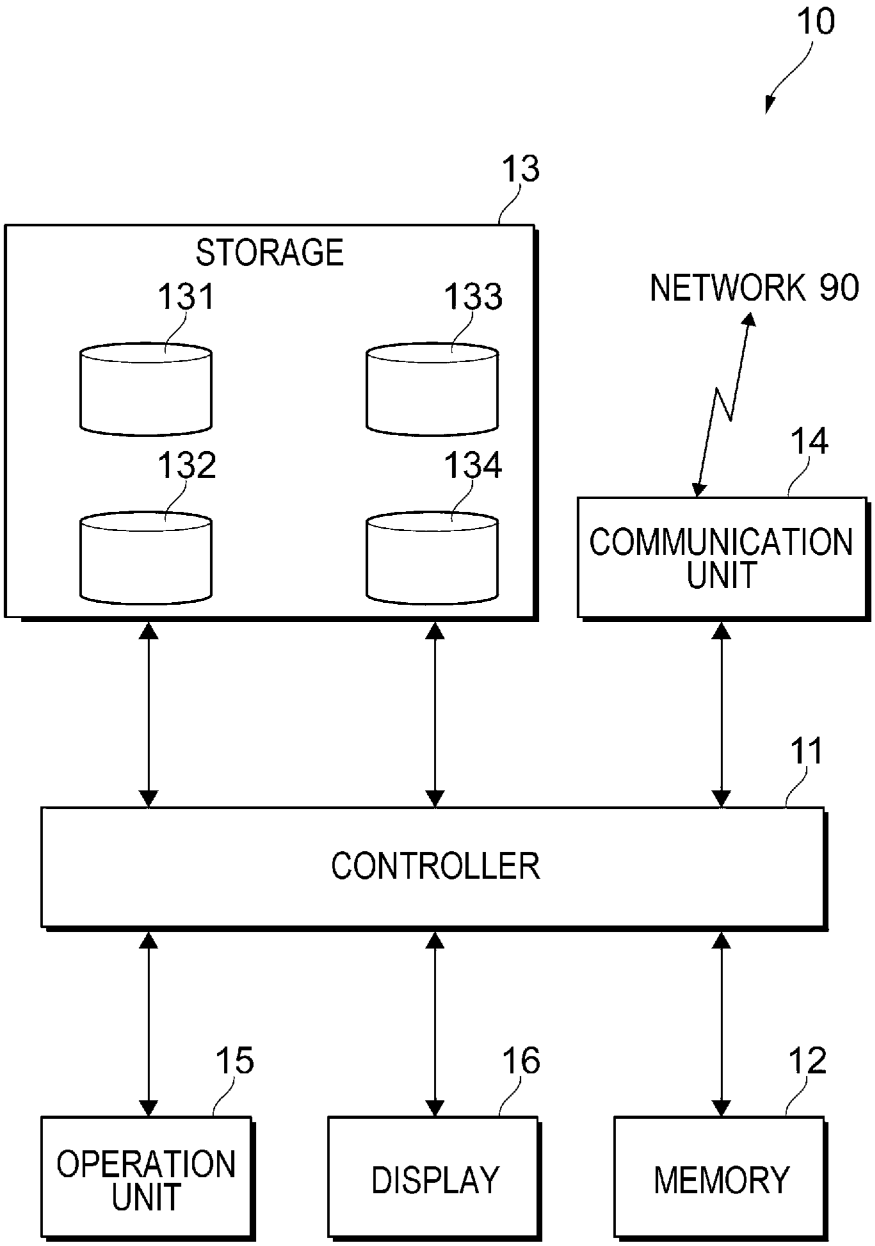
FIG. 2 is a view illustrating the hardware configuration of a management server serving as an information processing apparatus to which this exemplary embodiment is applied.

FIG. 2 is a view illustrating the hardware configuration of the management server 10 serving as an information processing apparatus to which this exemplary embodiment is applied. The management server 10 includes a controller 11, a memory 12, a storage 13, a communication unit 14, an operation unit 15, and a display 16. These components are connected, with a data bus, an address bus, a peripheral component interconnect (PCI) bus, or the like interposed therebetween.

The controller 11 is a processor configured to perform control of the function of the user terminal 30 by running various pieces of software such as the OS (basic software) and application software (application software). The controller 11 is configured as, for example, a central processing unit (CPU). The memory 12 is a memory area where the various pieces of software, data used for running the software, and the like are stored and is used as a work area for arithmetic operations. The memory 12 is configured as, for example, a random access memory (RAM).

The storage 13 is a memory area where input data for the various pieces of software, output data from the various pieces of software, and the like are stored. The storage 13 is configured as, for example, a hard disk drive (HDD), a solid state drive (SSD), or a semiconductor memory used for storing programs and various pieces of set data. The storage 13 stores, as databases storing various pieces of information such as a target element DB 131 storing target elements, a document DB 132 storing input documents and output documents, a concealment condition DB 133 storing concealment conditions, and an image output device DB 134 storing information regarding each of the image forming apparatuses 50-1 to 50-*n* each serving as the image output device.

The communication unit 14 transmits and receives data to and from the management server 10 and an external apparatus via the network 90. The operation unit 15 includes, for example, a keyboard, a mouse, mechanical buttons, and switches and receives input operation. The operation unit 15 also includes a touch sensor forming a touch panel integrally with the display 16. The display 16 is composed of, for example, a liquid crystal display or an organic electro luminescence (EL) display each of which is used to display information and displays an image, text data, and the like. On the display 16, a work space, a user interface for searching, and the like are displayed.

Hardware Configuration of User Terminal

The hardware configuration of the user terminal 30 is the same as the hardware configuration of the management server 10 illustrated in FIG. 2. That is, the user terminal 30 includes a controller, a memory, a storage, a communication unit, an operation unit, and a display that each have the same function of a corresponding one of the functions of the controller 11, the memory 12, the storage 13, the communication unit 14, the operation unit 15, and the display 16 in FIG. 2. The illustration and explanation of the hardware configuration of the user terminal 30 are thus omitted.

Hardware Configuration of Image Forming Apparatus

Figure 3:
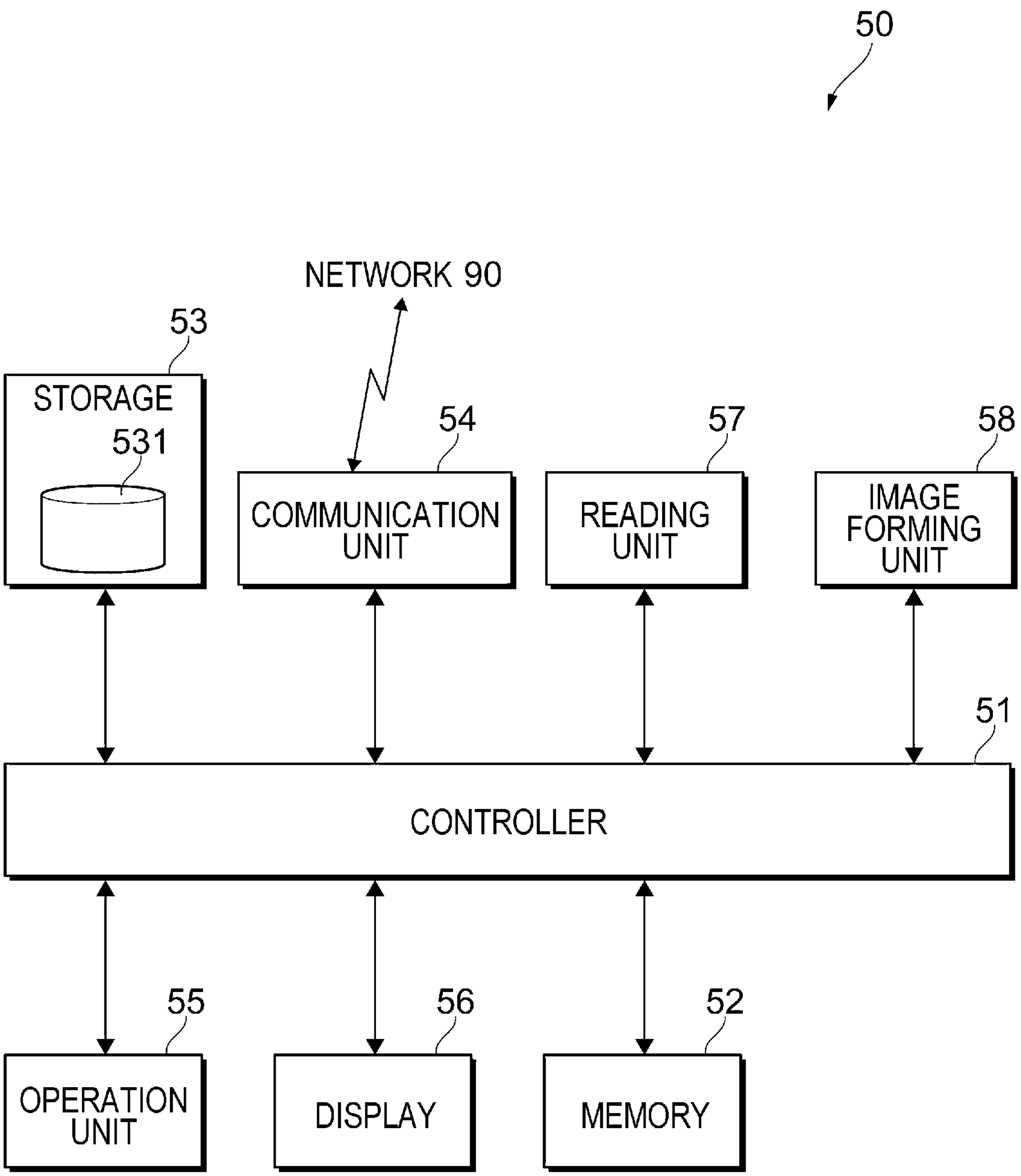
FIG. 3 is a view illustrating the hardware configuration of an image forming apparatus serving as the information processing apparatus to which this exemplary embodiment is applied.

FIG. 3 is a view illustrating the hardware configuration of the image forming apparatus 50 serving as the information processing apparatus to which this exemplary embodiment is applied.

The image forming apparatus 50 has a hardware configuration having components corresponding to the controller 11, the memory 12, the storage 13, the communication unit 14, the operation unit 15, and the display 16 in the hardware configuration of the management server 10 in FIG. 2.

That is, the image forming apparatus 50 includes a controller 51 configured as a processor such as a CPU, a memory 52 configured as a memory area such as a RAM, and a storage 53 configured as a memory area such as a HDD, a SSD, or a semiconductor memory. The storage 53 stores, as a database storing various pieces of information, an output place DB 531 or the like storing, for example, installation place information regarding the image forming apparatus 50. The image forming apparatus 50 also includes a communication unit 54 that transmits and receives data to and from the management server 10, the user terminal 30, and an external apparatus via the network 90. The image forming apparatus 50 also includes an operation unit 55 composed of a touch panel or the like and a display 56 composed of a liquid crystal display, an organic EL display, or the like.

Further, in addition to these components, the image forming apparatus 50 includes a reading unit 57 and an image forming unit 58. The reading unit 57 reads an image recorded on the medium (such as a document using paper as a media (paper document)) such as a sheet serving as a recording medium. The reading unit 57 is configured as, for example, a charge coupled device (CCD) scanner or a contact image sensor (CIS) scanner. In the CCD scanner, light beams are radiated from a light source onto a document, reflected light beams are reduced with a lens, and the light beams are received with CCDs. In the CIS scanner, light beams are serially radiated from a LED light source to a document, and reflected light beams are received with the CIS.

The image forming unit 58 forms an image based on image data on the printing surface of a sheet serving as the recording medium by using, for example, the electrophotographic system or the inkjet system. Examples of the image data in this exemplary embodiment include image data regarding the output document in which a target element included in the input document is replaced with a replacement element. These components are connected, with a data bus, an address bus, a PCI bus, or the like interposed therebetween.

Functional Configuration of Controller of Management Server

Figure 4:
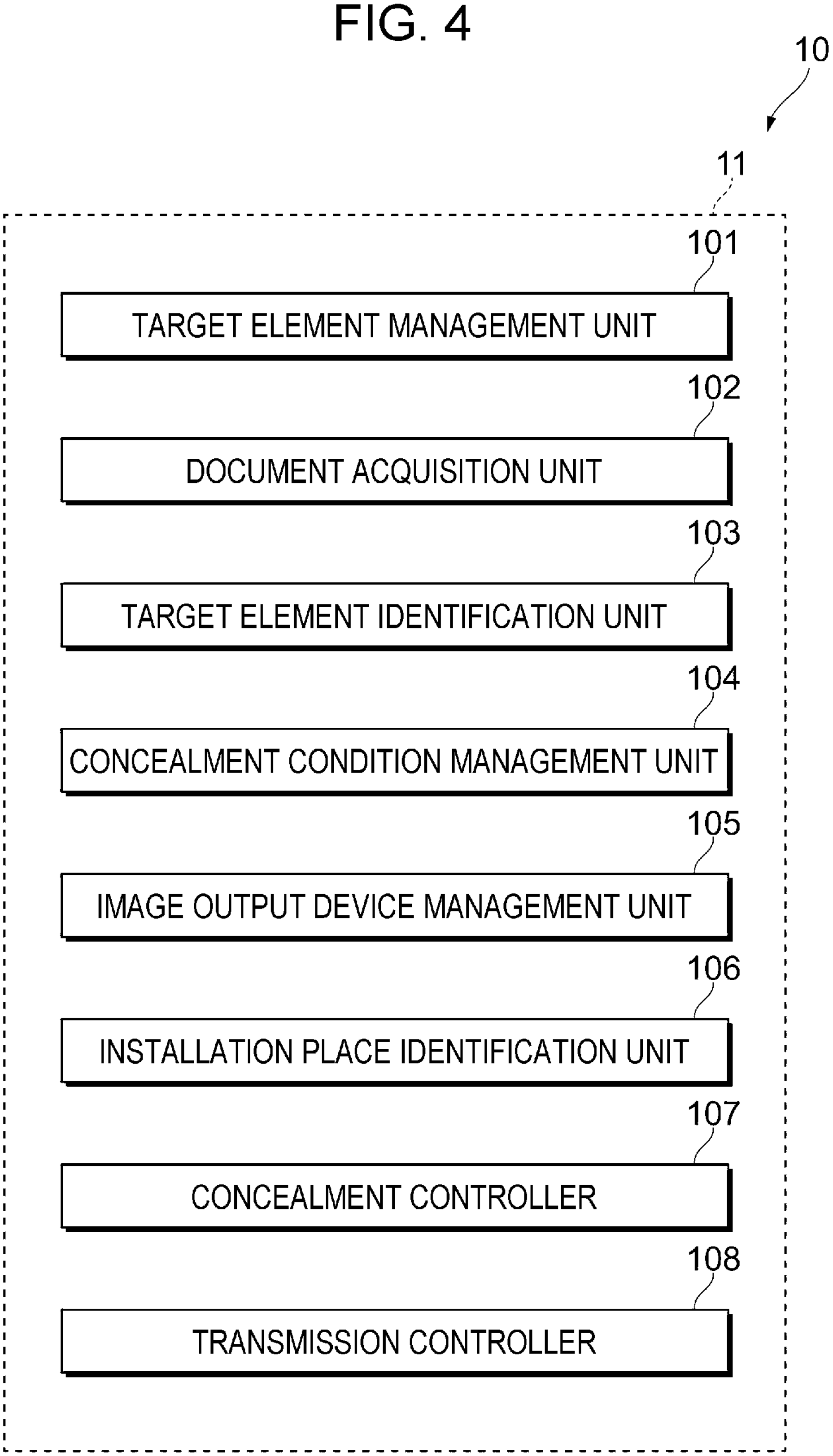
FIG. 4 is a view illustrating the functional configuration of a controller of the management server.

FIG. 4 is a view illustrating the functional configuration of the controller 11 of the management server 10.

A target element management unit 101, a document acquisition unit 102, a target element identification unit 103, a concealment condition management unit 104, an image output device management unit 105, an installation place identification unit 106, a concealment controller 107, and a transmission controller 108 function in the controller 11 of the management server 10.

The target element management unit 101 manages target elements in such a manner as to store the target elements in the database (for example, the target element DB 131 in FIG. 2). Each target element may be predetermined or may be registered through input operation by the user. The target element management unit 101 manages each target element and a corresponding one of replacement elements in such a manner as to store the target element and the replacement element in the database in association with each other. Specifically, the target element management unit 101 manages the replacement element in such a manner as to associate the target element with the replacement element for each target element and for each of target element types.

Examples of the target element type managed in the database include a character string and an image. Examples of the character string serving as a target element type include a Chinese character, hiragana (the cursive form of kana), katakana (the square form of kana), alphabet, a numeral, a font, color, thickness, and whether the character string is highlighted. Examples of the image serving as a target element type include a captured image, a drawn image, a color image, and a monochrome image. A specific example of target elements stored in the database will be described later with reference to FIG. 10.

The document acquisition unit 102 acquires an input document. Examples of the input document include an electronic document generated by causing an image forming apparatus 50 to read a paper document and an electronic document generated by the user terminal 30. The input document acquired by the document acquisition unit 102 may be managed in such a manner as to be stored in the database (for example, the document DB 132 in FIG. 2). The input document acquired by the document acquisition unit 102 may also be stored temporarily and may be deleted the moment that the output document is output from the image forming apparatus 50.

The target element identification unit 103 parses the input document acquired by the document acquisition unit 102 and identifies a target element. Specifically, the target element identification unit 103 identifies, as a target element, an element of one or more elements included in the input document, that is, an element belonging to a section predetermined as a section having similarity to a target element stored in the database (for example, the target element DB 131 in FIG. 2).

Note that a section having similarity to a target element herein may be set through input operation by the user. For example, for an element as a character string, a section having a different character size, font, color, or the like may be set as a section belonging to a section having similarity to a target element. A threshold for defining a section having similarity to a target element may also be provided. A section having similarity to a target element may also be set for each type of an element of the input document. For example, a section having similarity to a target element may be set to cause an image to have a larger section than a section of a character string. A specific example of an element identified by the target element identification unit 103 will be described later with reference to FIGS. 13A and 13B.

The concealment condition management unit 104 manages concealment conditions in such a manner as to store the concealment conditions in the database (for example, the concealment condition DB 133 in FIG. 2). Specifically, the concealment condition management unit 104 manages, as a concealment condition, the type of the installation place of the image forming apparatus 50 and an index (hereinafter, also referred to as a concealment level) indicating whether to perform concealment and the degree of the concealment in association with each other. The concealment level of the concealment condition is set in accordance with the output environment of the output document.

The higher information leakage risk the installation place of the image forming apparatus 50 like what is called a shared office has, the higher concealment level is set. The lower information leakage risk the installation place like the user's home has, the lower concealment level is set. How the concealment level is classified is not particularly limited. For example, the concealment level may be classified into two levels of HIGH and LOW or into three levels of HIGH, MEDIUM, and LOW.

For example, suppose a case where the concealment level is classified into the two levels of HIGH and LOW. In this case, the concealment level HIGH is associated with the type of an installation place not requiring an instruction from the user in concealing a target element, and the concealment level LOW is associated with the type of an installation place requiring an instruction from the user in concealing a target element. The concealment is not performed for an unregistered installation place type.

For example, suppose a case where the concealment level is classified into the three levels of HIGH, MEDIUM, and LOW. In this case, HIGH is associated with the type of an installation place not requiring an instruction from the user in concealing a target element, MEDIUM is associated with the type of an installation place requiring an instruction from the user in concealing a target element, and LOW is associated with the type of an installation place for which the target element is not concealed.

Examples of the type of the installation place of the image forming apparatus 50 include what is called SHARED OFFICE, LIBRARY, CONVENIENCE STORE, USER'S HOME, and PRIVATE OFFICE. In this case, for example, if the concealment level is classified into the three levels, the concealment levels of SHARED OFFICE and LIBRARY are registered to be HIGH; the concealment levels of CONVENIENCE STORE and USER'S HOME, MEDIUM; and the concealment level of PRIVATE OFFICE, LOW. A specific example of the concealment conditions stored in the database will be described later with reference to FIG. 11.

The image output device management unit 105 manages information regarding the image forming apparatus 50 serving as the image output device. For example, the image output device management unit 105 manages, as the information regarding the image forming apparatus 50, information regarding a place where the image forming apparatus 50 is installed (hereinafter, also referred to as installation place information) in such a manner as to store the installation place information in the database (for example, the image output device DB 134 in FIG. 2). Specifically, the image output device management unit 105 acquires installation place information transmitted from each of the image forming apparatuses 50-1 to 50-*n* and manages the acquired installation place information in such a manner as to store the installation place information in the database. A specific example of the installation place information stored in the database will be described later with reference to FIG. 12.

The installation place identification unit 106 identifies the type of the installation place of the image forming apparatus 50 designated as the image output device. Specifically, the installation place identification unit 106 identifies the type of the installation place of the image forming apparatus 50 designated as the image output device by the user on the basis of the installation place information transmitted from the user terminal 30.

The concealment controller 107 performs control to conceal a target element on the basis of the registered concealment condition. Specifically, the concealment controller 107 decides whether to perform concealment of the target element and the degree of the concealment on the basis of the type, of the installation place of the image forming apparatus 50, identified by the installation place identification unit 106 and the registered concealment condition. The phrase "whether to perform concealment" denotes whether to replace a target element included in the input document with a replacement element. The term "the degree of the concealment" denotes the degree of necessity to replace a target element included in the input document with a replacement element. A specific example of the control of the target element concealment by the concealment controller 107 will be described later with reference to FIGS. 13A and 13B.

The transmission controller 108 performs control to transmit, to the image forming apparatus 50, information for outputting an output document in which a target element included in the input document is concealed. Specifically, the transmission controller 108 performs the control to transmit, to the image forming apparatus 50, image data regarding the input document in which the target element is concealed. The transmission controller 108 also performs control to transmit, to the image forming apparatus 50, information indicating that an instruction from the user is required in concealing a target element (hereinafter, referred to as information indicating that instruction information is required).

The transmission controller 108 also performs control to transmit, to the image forming apparatus 50, information helping the user reading the output document to understand the output document. Specifically, the transmission controller 108 performs control to transmit, to the image forming apparatus 50, information having a list of correspondence of a character string and an image serving as a target element to a character string and an image serving as a replacement element. A specific example of the information having a list of correspondence between a target element and a replacement element will be described later with reference to FIG. 10.

Functional Configuration of Controller of User Terminal

Figure 5:
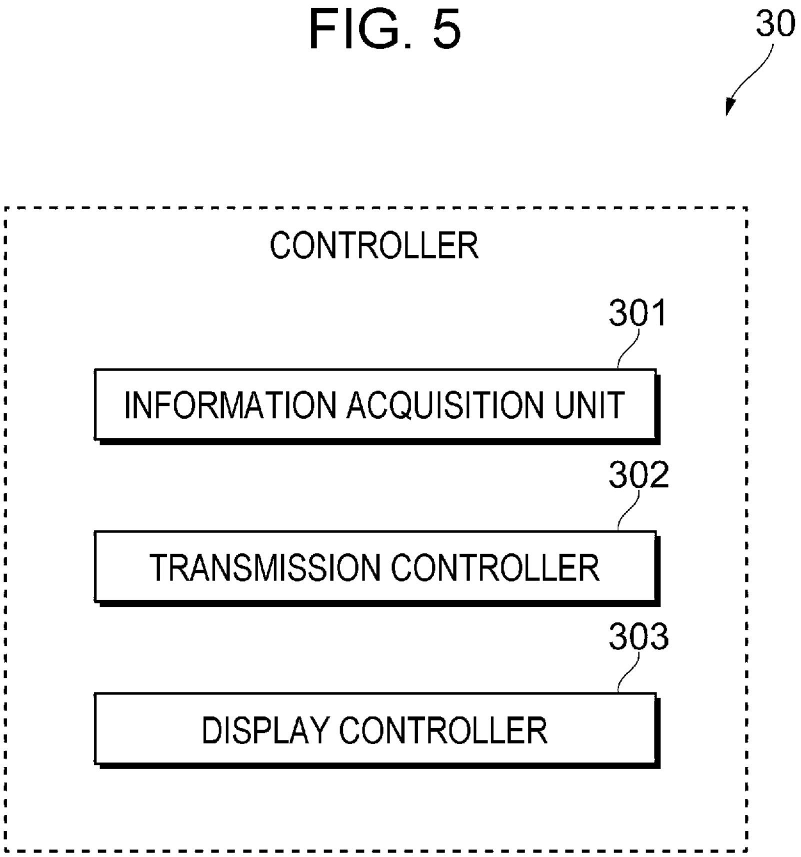
FIG. 5 is a view illustrating the functional configuration of a controller of a user terminal.

FIG. 5 is a view illustrating the functional configuration of the controller of the user terminal 30.

An information acquisition unit 301, a transmission controller 302, and a display controller 303 function in the controller of the user terminal 30.

The information acquisition unit 301 acquires various pieces of information. Specifically, the information acquisition unit 301 acquires information input of which is received by an operation unit. Examples of the information input of which is received by the operation unit include information input to designate an input document, information input to register a target element, information input to register a replacement element, and information input to register a concealment condition.

The information acquisition unit 301 also acquires various pieces of information transmitted from the management server 10. Examples of the information transmitted from the management server 10 include information indicating that registration of a target element is completed, information indicating that registration of a replacement element is completed, and information indicating that registration of a concealment condition is completed.

The transmission controller 302 performs control to transmit various pieces of information to the management server 10 or an external apparatus via a communication unit. For example, the transmission controller 302 performs control to transmit, to the management server 10, the information acquired by the information acquisition unit 301.

The display controller 303 performs control to display various pieces of information on the display. For example, the display controller 303 performs the control to display a user interface on the display. Examples of the user interface displayed on the display include a user interface displayed on the display when the user registers a target element, a replacement element, and a concealment condition.

Functional Configuration of Controller of Image Forming Apparatus

Figure 6:
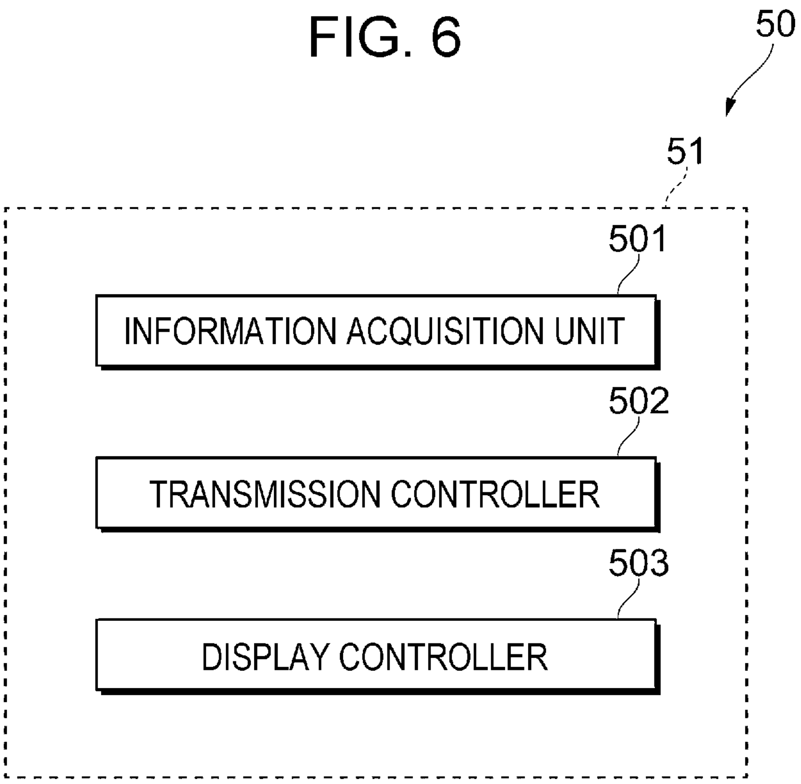
FIG. 6 is a view illustrating the functional configuration of a controller of the image forming apparatus.

FIG. 6 is a view illustrating the functional configuration of the controller 51 of the image forming apparatus 50.

An information acquisition unit 501, a transmission controller 502, and a display controller 503 function in the controller 51 of the image forming apparatus 50.

The information acquisition unit 501 acquires various pieces of information. Specifically, the information acquisition unit 501 acquires the information input of which is received by the operation unit 55. Examples of the information input of which is received by the operation unit 55 include installation place information input to register the installation place of the image forming apparatus 50, an input document generated by being read by the reading unit 57 (see FIG. 3), information input to designate an input document stored in the database (for example, the document DB 132), and information to give an instruction to conceal a target element.

The information acquisition unit 501 also acquires information transmitted from the management server 10 via the communication unit 54. Examples of the information transmitted from the management server 10 include image data regarding an input document in which a target element is concealed, image data regarding an input document having a target element yet to be concealed, information indicating a target element and a replacement element, the information having the list of correspondence between a target element and a replacement element, the information indicating that instruction information is required.

The transmission controller 502 performs control to transmit various pieces of information to the management server 10. Specifically, the transmission controller 502 performs the control to transmit the various pieces of information to the management server 10 via the communication unit 54 (see FIG. 3). For example, the transmission controller 502 performs the control to transmit the information acquired by the information acquisition unit 501 to the management server 10.

The display controller 503 performs control to display various pieces of information on the display 56. For example, the display controller 503 performs the control to display a user interface on the display 56. Examples of the user interface displayed on the display 56 include a user interface displayed on the display 56 when the user gives an instruction as to whether to perform concealment of a target element. A specific example of the user interface displayed on the display 56 will be described later with reference to FIG. 14.

Flow of Processing by Management Server

Figure 7:
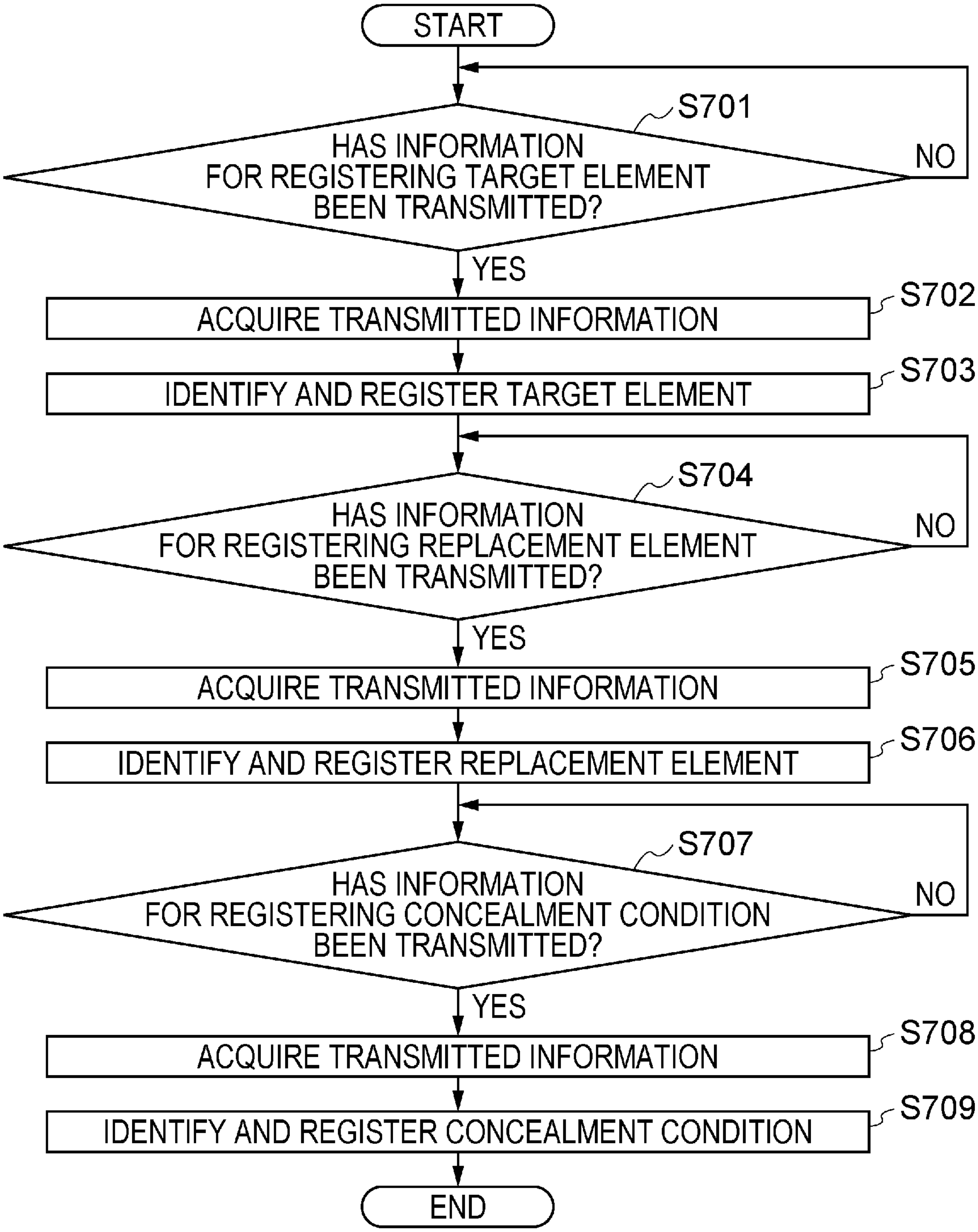
FIG. 7 is a flowchart illustrating part of processing by the management server, the part being composed of steps up to registration of a target element, a replacement element, and a concealment condition.
Figure 8:
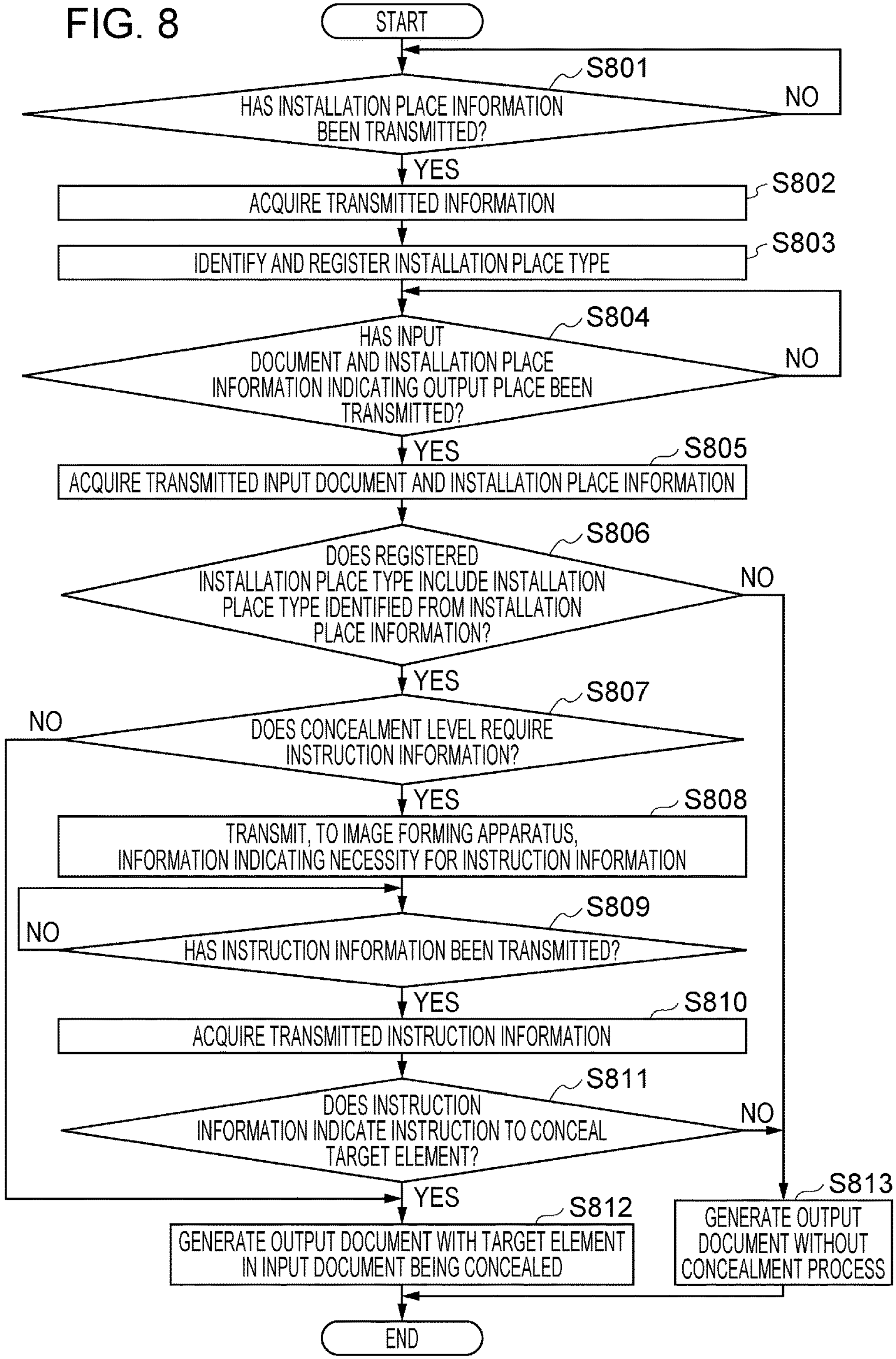
FIG. 8 is a flowchart illustrating part of the processing performed by the management server, the part being composed of steps from registration of the installation place of the image forming apparatus to generation of an output document having target elements concealed.

FIGS. 7 and 8 are each a flowchart illustrating the flow of processing by the management server 10.

FIG. 7 illustrates part of the flow of the processing by the management server 10. The part is composed of steps up to registration of a target element, a replacement element, and a concealment condition. In the examples in FIGS. 7 and 8, the concealment level is classified into the two levels of HIGH and LOW.

If information for registering a target element has been transmitted from the user terminal 30 (YES in step S701), the management server 10 acquires the transmitted information (step S702), identifies the target element from the acquired information, and registers the target element (step S703). Specifically, the management server 10 identifies the target element from the information acquired in step S702. The information for registering a target element is transmitted in response to input operation performed on the user terminal 30 by the user. The input operation on the user terminal 30 is performed by, for example, a system administrator in the office.

The management server 10 manages the identified target element in such a manner as to store the target element in the database (for example, the target element DB 131 in FIG. 2). The information for registering a target element transmitted from the user terminal 30 includes character information and image information that serve as a target element. In contrast, if the information for registering a target element has not been transmitted from the user terminal 30 (NO in step S701), the management server 10 repeats step S701 until the information for registering a target element is transmitted from the user terminal 30.

If the information for registering a replacement element has been transmitted from the user terminal 30 (YES in step S704), the management server 10 acquires the transmitted information (step S705), identifies the replacement element from the acquired information, and registers the replacement element (step S706). Specifically, the management server 10 identifies a replacement element and the target element corresponding to the replacement element from the information acquired in step S705. The management server 10 manages the identified replacement element in association with the target element stored in the database (for example, the target element DB 131 in FIG. 2). The information for registering a replacement element that has been transmitted from the user terminal 30 includes character information and image information that serve as a replacement element and information indicating a target element corresponding to a replacement element. In contrast, if the information for registering a replacement element has not been transmitted from the user terminal 30 (NO in step S704), the management server 10 repeats step S704 until the information for registering a replacement element is transmitted from the user terminal 30.

If the information for registering a concealment condition has been transmitted from the user terminal 30 (YES in step S707), the management server 10 acquires the transmitted information (step S708), identifies the concealment condition from the acquired information, and registers the concealment condition (step S709). Specifically, the management server 10 identifies the concealment condition from the information acquired in step S708. The management server 10 then manages the identified concealment condition in such a manner as to store the concealment condition in the database (for example, the concealment condition DB 133 in FIG. 2). The information for registering a concealment condition transmitted from the user terminal 30 includes information indicating the content of the concealment condition. In contrast, if the information for registering a concealment condition has not been transmitted (NO in step S707), the management server 10 repeats step S707 until the information for registering a concealment condition is transmitted.

FIG. 8 illustrates part of the flow of the processing by the management server 10. The part is composed of steps from the registration of the installation place of an image forming apparatus 50 to the generation of an output document in which the target element is concealed.

If the installation place information has been transmitted from the image forming apparatus 50 (YES in step S801), the management server 10 acquires the transmitted installation place information (step S802), identifies the type of the installation place from the acquired installation place information, and registers the type of the installation place (step S803). Specifically, the management server 10 identifies the type of the installation place from the installation place information acquired in step S802. The management server 10 then manages the identified type of the installation place in such a manner as to store the type in the database (for example, the image output device DB 134 in FIG. 2). In contrast, if the installation place information has not been transmitted from the image forming apparatus 50 (NO in step S801), the management server 10 repeats step S801 until the installation place information is transmitted from the image forming apparatus 50.

If an input document and the installation place information indicating an output place has been transmitted from the image forming apparatus 50 (YES in step S804), the management server 10 acquires the input document and the installation place information that are transmitted (step S805). In contrast, if an input document and the installation place information has not been transmitted from the image forming apparatus 50 (NO in step S804), the management server 10 repeats step S804 until an input document and the installation place information is transmitted from the image forming apparatus 50.

If the type of the installation place registered in step S803 includes the type of the installation place identified from the installation place information acquired in step S805 (YES in step S806), the management server 10 proceeds to step S807. In contrast, if the type of the installation place of the image forming apparatus 50 registered in step S803 does not include the type of the installation place identified from the installation place information acquired in step S805 (NO in step S806), the management server 10 generates an output document without executing a concealment process (step S813).

If the concealment level associated with the registered type of the installation place requires instruction information (for example, the concealment level is LOW) (YES in step S807), the management server 10 transmits, to the image forming apparatus 50, information indicating that instruction information is required (step S808). In contrast, if the concealment level associated with the registered type of the installation place does not require instruction information (for example, the concealment level is HIGH) (NO in step S807), the management server 10 generates an output document in which the target element included in the input document acquired in step S805 is concealed (step S812).

If the instruction information has been transmitted from the image forming apparatus 50 (YES in step S809), the management server 10 acquires the transmitted instruction information (step S810). In contrast, if the instruction information has not been transmitted from the image forming apparatus 50 (NO in step S809), the management server 10 repeats step S809 until the instruction information is transmitted from the image forming apparatus 50.

If the instruction information acquired in step S810 indicates an instruction to conceal the target element (YES in step S811), the management server 10 generates an output document in which the target element included in the input document acquired in step S805 is concealed (step S812). In contrast, if the instruction information acquired in step S810 does not indicate an instruction to conceal the target element (NO in step S811), the management server 10 generates an output document without executing the concealment process (step S813).

Flow of Processing by Image Forming Apparatus

Figure 9:
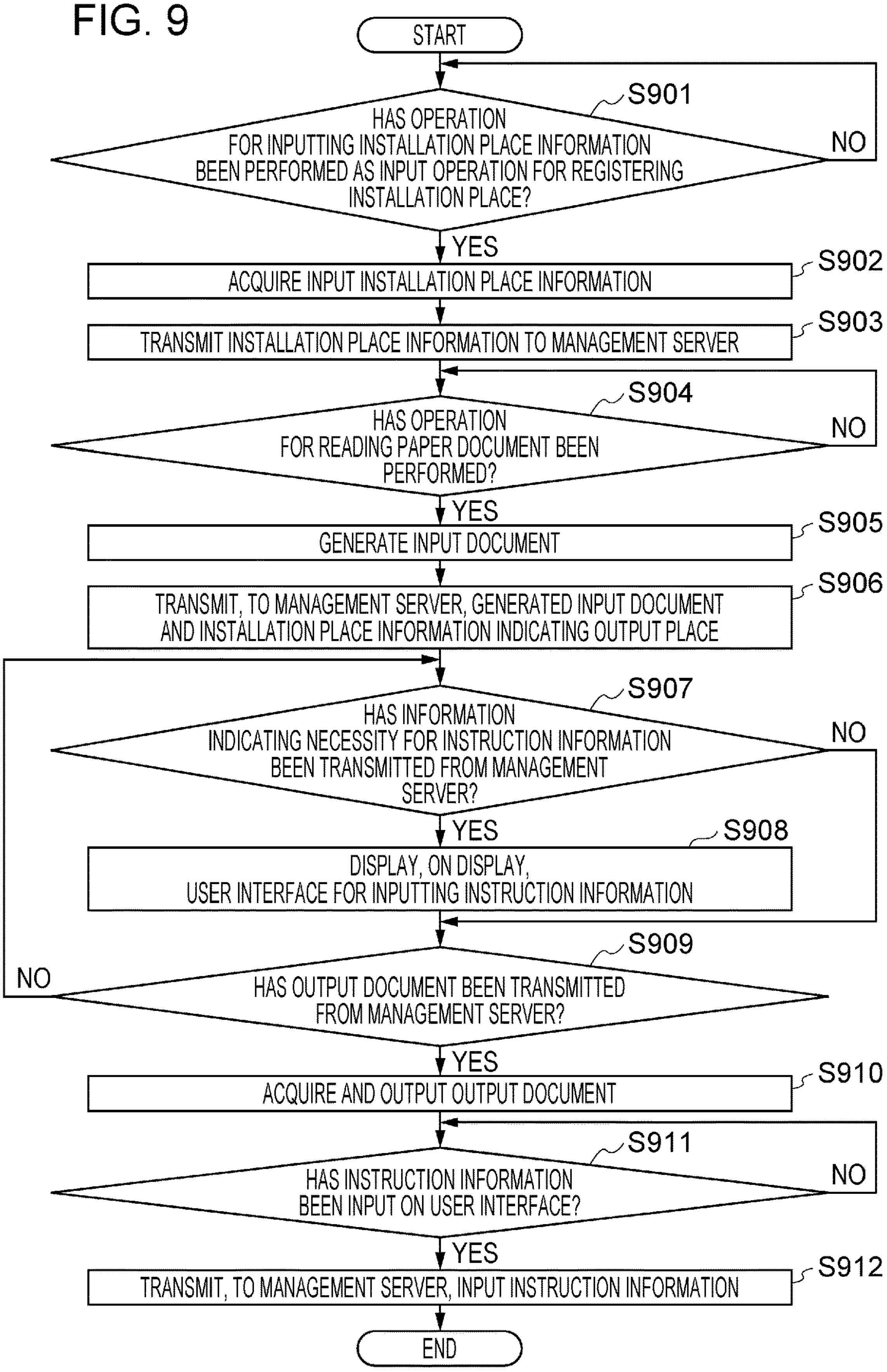
FIG. 9 is a flowchart illustrating processing by the image forming apparatus.

FIG. 9 is a flowchart illustrating processing by the image forming apparatus 50.

If an operation for inputting installation place information has been performed as input operation for registering the installation place of the image forming apparatus 50 (YES in step S901), the image forming apparatus 50 acquires the input installation place information (step S902) and transmits the acquired installation place information to the management server 10 (step S903). In contrast, if an operation for inputting installation place information has not been performed (NO in step S901), the management server 10 repeats step S901 until an operation for inputting installation place information is performed. The input operation for registering installation place is performed, for example, by an administrator for the image forming apparatus 50.

If an operation for reading a paper document has been performed (YES in step S904), the image forming apparatus 50 generates the input document (step S905) and transmits, to the management server 10, the generated input document and the installation place information indicating an output place (step S906). In contrast, if an operation for reading a paper document has not been performed (NO in step S904), the image forming apparatus 50 repeats step S904 until an operation for reading a paper document is performed.

If the information indicating that instruction information is required has been transmitted from the management server 10 (YES in step S907), the image forming apparatus 50 displays, on the display 56 (see FIG. 3), a user interface for inputting the instruction information (step S908). In contrast, if the information indicating that instruction information is required has not been transmitted from the management server 10 (NO in step S907), and if the output document has been transmitted (YES in step S909), the image forming apparatus 50 acquires and outputs the transmitted output document (step S910). If each of the information indicating that instruction information is required and the output document has not been transmitted (NO in each of steps S907 and S909), the image forming apparatus 50 repeats steps S907 and S909 until the information indicating that instruction information is required or the output document is transmitted from the management server 10.

If the instruction information has been input on the user interface displayed in step S908 (YES in step S911), the image forming apparatus 50 transmits the input instruction information to the management server 10 (step S912). In contrast, if the instruction information has not been input on the user interface (NO in step S911), the image forming apparatus 50 repeats step S911 until the instruction information is input on the user interface.

Specific Examples

Figure 10:
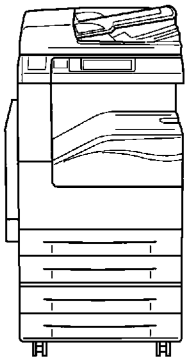
FIG. 10 is a table illustrating a specific example of target elements stored in the database.
Figure 10:

FIG. 10 is a table illustrating a specific example of target elements stored in the database. In the database (for example, the target element DB 131 in FIG. 2), target elements are associated with replacement elements. For example, in the example in FIG. 10, the character string "TTT" as a target element is associated with the character string "XXX" as a replacement element. The character string "SSS" as a target element is associated with the character string "YYY" as a replacement element. The character string "CCC" as a target element is associated with the character string "ZZZ" as a replacement element. The character string "Appp" as a target element is associated with the character string "ABCD" as a replacement element. An image representing an image forming apparatus as a target element is associated with an image representing an airplane as a replacement element.

If the input document includes the character string "TTT", the character string "TTT" is concealed by being identified as a target element and replaced with the character string "XXX" as a replacement element. In addition, if the input document includes an image representing the image forming apparatus in FIG. 10, the image representing the image forming apparatus in FIG. 10 is concealed by being identified as a target element and replaced with the image representing the airplane in FIG. 10 as a replacement element.

Note that as described above, the element identified as the target element is an element belonging to a section predetermined as a section having similarity to a target element, and the section having similarity to the target element may be set through input operation by the user. Accordingly, for example, even if an image of the image forming apparatus in FIG. 10 is captured (or drawn) from an angle different from the angle used for the image forming apparatus, the image may be set as the section belong to the section having similarity to the target element.

The content illustrated in FIG. 10 may be output as information having a list of correspondence between a target element and a replacement element. The information having a list of correspondence between a target element and a replacement element may be shared in the organization as, for example, information knowable in advance by users belonging to the organization. In addition, even for the same target element, a replacement element shared by users belonging to a group a in the same company may be made different from a replacement element shared by users belonging to a group b, and thereby information leakage risk may be reduced further. In addition, if a confidentiality agreement is concluded between Company A and Company B in a business relationship, the information having a list of correspondence between a target element and a replacement element may be shared by the companies.

FIG. 11 is a table illustrating a specific example of the concealment conditions stored in the database. In the example in FIG. 11, the concealment level is classified into the two levels of HIGH and LOW.

In the database (for example, the concealment condition DB 133 in FIG. 2), a type of the installation place of the image forming apparatus 50 as the image output device is associated with a concealment level. For example, in the example in FIG. 11, the concealment level of each of the installation place type "SHARED OFFICE" and the installation place type "LIBRARY" is HIGH. The concealment level of each of the installation place type "convenience store", the installation place type "USER'S HOME", and the installation place type "private office" is LOW.

Suppose a case where the concealment level HIGH is set for a type of an installation place not requiring an instruction from the user in concealing a target element, and the concealment level LOW is set for a type of an installation place requiring an instruction from the user in concealing a target element. In this case, the concealment level of SHARED OFFICE and LIBRARY is HIGH and thus applies to the type of an installation place not requiring an instruction from the user in concealing a target element. For example, if the user outputs an output document from the image forming apparatus 50 installed in the shared office, an output document in which the target element is concealed is output regardless of whether an instruction from the user is given. In contrast, the concealment level of CONVENIENCE STORE, USER'S HOME, and PRIVATE OFFICE is LOW and thus applies to the type of an installation place requiring an instruction from the user in concealing a target element.

FIG. 12 is a table illustrating a specific example of information regarding the image forming apparatuses 50 stored in the database. In the example in FIG. 12, like the example in FIG. 11, the concealment level is classified into the two levels of HIGH and LOW.

In the database (for example, the image output device DB 134 in FIG. 2), each of the image forming apparatuses 50-1 to 50-*n* actually installed as the image output device in a corresponding one of sites is associated with an ID, the type of an installation place, and a concealment level. For example, in the example in FIG. 12, the image forming apparatus 50 having the ID "123001" and the image forming apparatus 50 having the ID "123007" are each installed in LIBRARY, and the concealment level thereof is HIGH.

An image forming apparatus 50 having the ID "123002" and the image forming apparatus 50 having the ID "123005" are each installed in PRIVATE OFFICE, and the concealment level thereof is LOW. The image forming apparatus 50 having the ID "123003" and the image forming apparatus 50 having the ID "123008" are each installed in SHARED OFFICE, and the concealment level thereof is HIGH. The IDs, the types of the installation places, and the concealment levels of the other image forming apparatuses 50 are described as in FIG. 12.

Figure 13A:
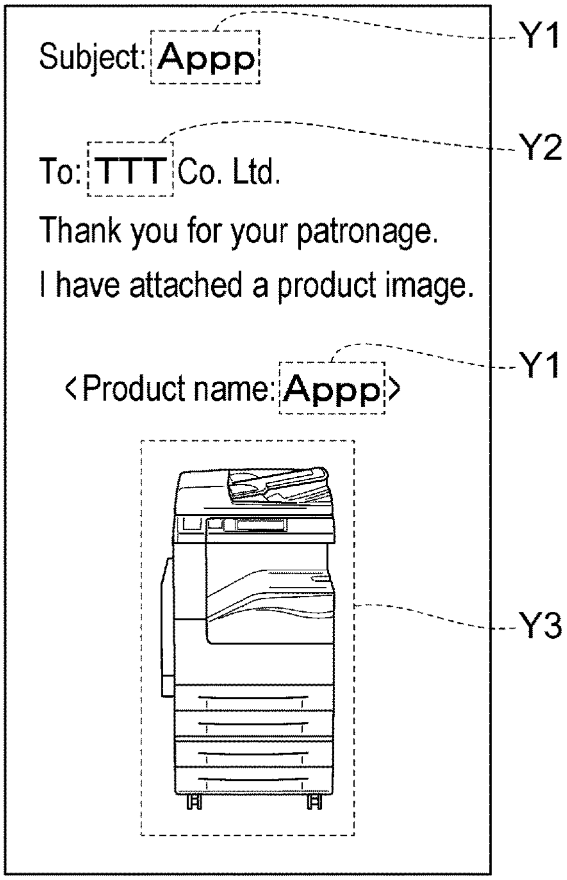
FIGS. 13A and 13B are each a view illustrating a specific example of an input document and an output document.
Figure 13B:
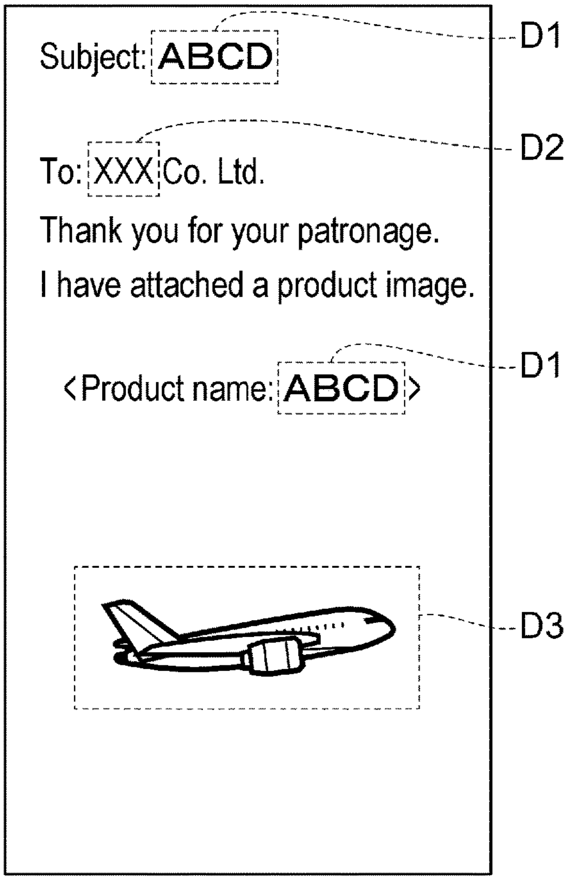

FIGS. 13A and 13B are each a view illustrating a specific example of an input document and an output document.

FIG. 13A illustrates a specific example of an input document including the target elements illustrated in FIG. 10 described above. The input document illustrated in FIG. 13A includes target elements Y1 to Y3. The target element Y1 (Appp) of these is an element as a character string and is associated with the replacement element "ABCD" in the database illustrated in FIG. 10. Accordingly, the target element Y1 (Appp) is concealed by being replaced with a replacement element D1 (ABCD) as illustrated in FIG. 13B.

The target element Y2 (TTT) is also an element as a character string and is associated with the replacement element "XXX" in the database illustrated in FIG. 10. Accordingly, the target element Y2 (TTT) is concealed by being replaced with a replacement element D2 "XXX" as illustrated in FIG. 13B. The target element Y3 (an image representing an image forming apparatus) is an element as an image and is associated with a replacement element (an image representing an airplane) in the database illustrated in FIG. 10. Accordingly, the target element Y3 (image representing the image forming apparatus) is concealed by being replaced with a replacement element D3 (image representing the airplane) as illustrated in FIG. 13B.

Figure 14:
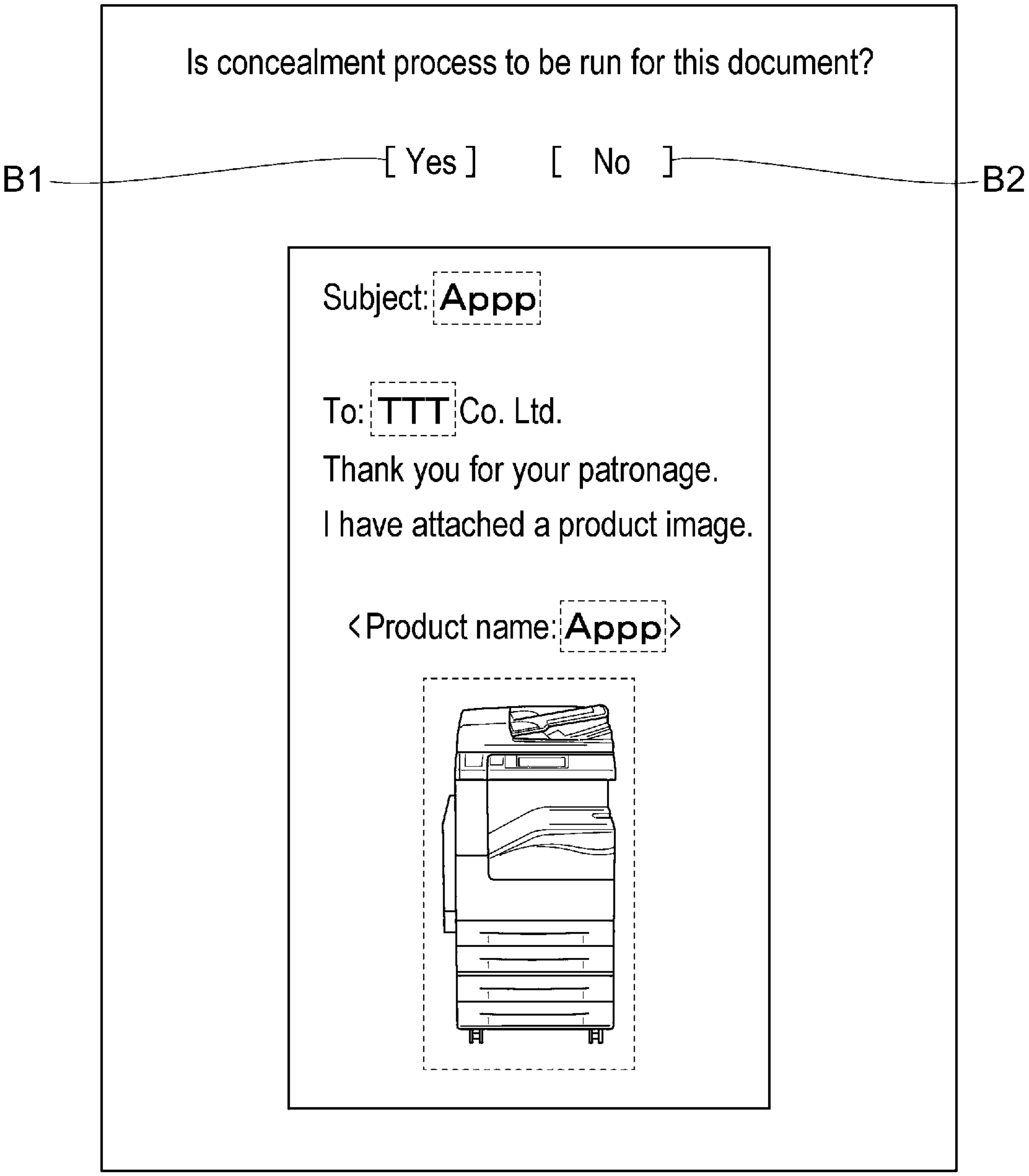
FIG. 14 is a view illustrating a specific example of a user interface displayed on the image forming apparatus when the user gives an instruction as to whether to perform concealment of a target element.

FIG. 14 is a view illustrating a specific example of the user interface displayed on the image forming apparatus 50 when the user gives an instruction as to whether to perform concealment of a target element.

If information indicating that instruction information is required has been transmitted from the management server 10, the image forming apparatus 50 displays, on the display 56, the user interface for the user to input the instruction information. As illustrated in FIG. 14, the message "Is concealment process to be run for this document?", buttons B1 and B2 for respectively selecting Yes and No, and a preview image of an input document including the target elements are displayed on the user interface.

In the preview image of the input document, as illustrated in FIG. 14, for example, locations where the target elements are present may be represented by broken lines. The locations where the target elements are present may also be highlighted, but this is not illustrated. To conceal the target elements, the user presses the button B1 representing Yes. In response to this, the image forming apparatus 50 generates instruction information indicating that the target elements are to be concealed and transmits the generated instruction information to the management server 10. In contrast, not to conceal the target elements, the user presses the button B2 representing No. In response to this, the image forming apparatus 50 generates instruction information indicating that the target elements are not to be concealed and transmits the generated instruction information to the management server 10.

This exemplary embodiment has heretofore been described; however, the present disclosure is not limited to this exemplary embodiment above. Effects of the present disclosure is not limited to those described for this exemplary embodiment above. For example, the configuration of the information processing system 1 illustrated in FIG. 1, the hardware configuration of the management server 10 illustrated in FIG. 2, and the hardware configuration of the image forming apparatus 50 illustrated in FIG. 3 are merely an example for implementing the aspects of the present disclosure, and the disclosure is not particularly limited thereto. The functional configuration of the management server 10 illustrated in FIG. 4, the functional configuration of the user terminal 30 illustrated in FIG. 5, and the functional configuration of the image forming apparatus 50 illustrated in FIG. 6 are also merely an example, and the disclosure is not particularly limited thereto. It suffices that the information processing system 1 in FIG. 1 has the function of performing as a whole the processing described above, and the used functional configuration is not limited to those in the examples in FIGS. 4 to 6.

The order of the steps in the processing by the management server 10 illustrated in FIGS. 7 and 8 and the order of the steps in the processing by the image forming apparatus 50 illustrated in FIG. 9 are also merely an example, and the present disclosure is not particularly limited thereto. The processing may be performed chronologically in the order of the illustrated steps but does not necessarily have to be performed chronologically. The processing may be performed in parallel or separately. The specific examples illustrated in FIGS. 10 to 14 are also merely an example, and the present disclosure is not particularly limited thereto.

For example, in the exemplary embodiment above, the concealment process is executed by the management server 10. However, at least part of the function of the management server 10 may be transferred to the user terminal 30, the image forming apparatus 50, or both to thereby enable at least part of the concealment process to be executed.

In the exemplary embodiment above, each type of the installation place is associated with a concealment level as a concealment condition; however, the present disclosure is not limited to this. For example, a concealment level may be associated with an image forming apparatus 50 individually.

In the exemplary embodiment above, the information indicating the types of the respective installation places of the image forming apparatuses 50 and concealment levels are predetermined as the concealment conditions; however, the present disclosure is not limited to this. For example, time of day when an output document is output, the attribute of a user who performs operation for outputting an output document, location information regarding the installation place of an image forming apparatus 50, or an installation store name therefor, or the like may be predetermined as the concealment condition.

The concealment process in the exemplary embodiment above is a process in which a target element is replaced with a replacement element; however, the present disclosure is not limited to this. For example, the following option for the user may be provided: one or more target elements only are registered, and one or more replacement elements are not registered. In this case, the target element DB 131 has one or more target elements associated with the one or more blank (unregistered) replacement elements. In the concealment process, replacement may be performed in the following manner. If a replacement element associated with a target element is present, the replacement described above is performed. If a replacement element is not present, replacement with a predetermined cipher (such as filling with black) is performed.

In the example in FIG. 14 described above, portions where the target elements are present are represented by the broken lines in the preview image of the input image displayed on the image forming apparatus 50. However, for example, in the case of a preview image of an input image displayed on the user terminal 30, a replacement element associated with a target element may be displayed as pop up in response to the user performing an operation for selecting the target element with the mouse or the like (for example, mouseover).

In the example in FIG. 14 described above, the preview image of the input image displayed on the image forming apparatus 50 is exemplified. However, the preview image of the output image after the concealment may be displayed together with the preview image of the input image.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing system comprising:

one or more processors that are implemented with hardware and configured to:

identify a target element of a document;

store a concealment condition, the concealment condition indicating a predetermined output place for outputting the document in which concealment of the target element is to be performed;

determine, given that the predetermined output place is an installation place of an image output device, whether to perform the concealment and a degree of the concealment, based on a type of the installation place of the image output device that outputs the document;

perform concealment of the target element and output the document with the target element concealed, if the document is requested to be output in the predetermined output place specified in the concealment condition; and output the document without the target element concealed, if the document is not requested to be output in the predetermined output place specified in the concealment condition.

2. The information processing system according to claim 1, wherein the one or more processors are configured to:

replace the target element with a replacement element having a visual appearance different from a visual appearance of the target element.

3. The information processing system according to claim 2, wherein the replacement element is predetermined for the target element.

4. The information processing system according to claim 2, wherein the one or more processors are configured to:

output information indicating correspondence of a character string and an image that each serve as the target element to a character string and an image that each serve as the replacement element.

5. The information processing system according to claim 1, wherein the one or more processors are configured to:

manage the installation place of the image output device in association with a concealment level indicating whether to perform the concealment and the degree; and on a basis of the concealment level, decide whether to perform the concealment and the degree.

6. The information processing system according to claim 5, wherein the concealment level includes, as the degree of the concealment, a concealment level requiring an instruction from a user for the concealment and a concealment level not requiring the instruction from the user for the concealment.

7. The information processing system according to claim 1, wherein the one or more processors are configured to:

perform the concealment of an additional element in the document, the additional element belonging to a section being determined as having similarity to the target element.

8. The information processing system according to claim 7, wherein the section is predetermined for a type of element in the document.

9. The information processing system according to claim 8, wherein the section is predetermined to cause an image included in the document to have a larger section than a section of a character string in the document.

10. An information processing apparatus comprising:

a processor that is implemented with hardware and configured to:

identify a target element of a document;

store a concealment condition, the concealment condition indicating a predetermined output place for outputting the document in which concealment of the target element is to be performed;

determine, given that the predetermined output place is an installation place of an image output device, whether to perform the concealment and a degree of the concealment, based on a type of the installation place of the image output device that outputs the document; and transmit the document and the concealment condition to an image output device installed in the predetermined output place so as to cause the image output device to output the document as modified based on the concealment condition.

11. A non-transitory computer readable medium storing a program causing a computer to execute a process comprising:

identifying a target element of a document;

storing a concealment condition, the concealment condition indicating a predetermined output place for outputting the document in which concealment of the target element is to be performed;

determining, given that the predetermined output place is an installation place of an image output device, whether to perform the concealment and a degree of the concealment, based on a type of the installation place of the image output device that outputs the document;

performing concealment of the target element and outputting the document with the target element concealed, in response to the document being requested to be output in the predetermined output place specified in the concealment condition; and outputting the document without the target element concealed, in response to the document not being requested to be output in the predetermined output place specified in the concealment condition.

* * * * *